United States Patent Office 2,978,497
Patented Apr. 4, 1961

2,978,497

NITRAZA ESTERS

Milton B. Frankel, Pasadena, and Karl Klager, Monrovia, Calif., assignors to Aerojet-General Corporation, Azusa, Calif., a corporation of Ohio No Drawing. Filed Aug. 22, 1955, Ser. No. 529,948

22 Claims. (Cl. 260—482)

This invention relates to new compositions of matter and a method for their preparation. In particular, it relates to nitraza esters having the general formula:

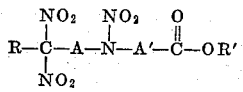

wherein R is a hydrogen or alkyl radical, R' is an alkyl or nitroalkyl radical and A and A' are alkylene radicals.

These compounds are excellent plasticizers for nitropolymers, such as nitrocellulose or the polyurethane plastics disclosed in assignee's copending application Serial No. 422,649, filed April 12, 1954, now abandoned. Commercial plasticizers used at the present time are non-explosive and hence detract from the explosive power of the nitropolymers into which they are incorporated. The compounds of this invention, however, are not only plasticizers but also exhibit high explosive energy.

The nitropolymers can be polymerized in the presence of the nitraza ester or the nitraza ester can be blended into the nitropolymer after polymerization. The plasticizer is incorporated into the nitropolymer in amounts of preferably from about 10% to about 40% by weight of the total mixture.

The nitraza esters of this invention are prepared by reacting a nitraza acid or acid halide with an alcohol, in accordance with the general reaction scheme set forth below:

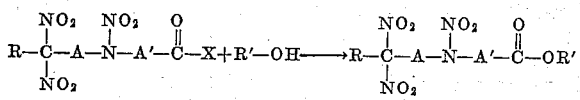

wherein R is a hydrogen or alkyl radical, R' is an alkyl or nitroalkyl radical, A and A' are alkylene radicals and X is a halogen or hydroxy radical.

The reaction is preferably conducted in the presence of a Friedel-Crafts catalyst such as aluminum chloride, titanium tetrachloride, antimony pentachloride, boron trifluoride, ferric chloride, etc., due to the improved yields obtained.

Either acids or acid halides can be employed as starting materials in the practice of our invention, however, we prefer to use acid halides due to the superior yields and faster reaction rates obtained.

The acids and acid halides employed as starting materials in the practice of this inventoin are prepared by condensing an amino acid with a nitroalkanol followed by nitration of the amine group with nitric acid. The corresponding acid halides are prepared by halogenating the acid with a conventional halogenation agent such as thionyl chloride. These procedures are more fully disclosed in assignee's copending application Serial No. 416,386, filed March 15, 1954, now abandoned.

To more clearly illustrate this invention, the following examples are presented. It is to be understood, however, that these examples are presented merely as a means of illustration and are not intended to limit the scope of the invention in any way.

EXAMPLE I

*Preparation of methyl 3,5,5-trinitro-3-aza-hexanoate*

3,5,5-trinitro-3-aza-hexanoyl chloride was dissolved in methanol and refluxed for one half hour. Upon cooling a quantitative yield of methyl 3,5,5-trinitro-3-aza-hexanoate precipitated as white crystals, M.P. 80° C. Elemental analysis of the product was as follows:

Calculated for $C_6H_{10}N_4O_8$: Percent C, 27.07; percent H, 3.79; percent N, 21.05. Found: Percent C, 27.59; percent H, 3.79; percent N, 20.95.

EXAMPLE II

*Preparation of 2,2,2-trinitroethyl-3,5,5-trinitro-3-aza-hexanoate*

In a 100 ml. round bottom flask, fitted with a condenser and drying tube, was placed a solution of 3.62 gm. (0.02 mole) of 2,2,2-trinitroethanol, in 50 ml. of dry ethylene dichloride. Anhydrous aluminum chloride, 0.27 gm. (0.002 mole), was added and the solution turned yellow. To the solution was added 2.7 gm. (0.01 mole) of 3,5,5-trinitro-3-aza-hexanoyl chloride. The reaction mixture was refluxed until evolution of hydrogen chloride gas had ceased. The black mixture was cooled and filtered, the solid was washed with cold dilute hydrochloric acid, water, dried and recrystallized from ethylene dichloride using charcoal to give 2.13 gm. (50.3%) of white crystals, M.P. 121–121.5° C. Elemental analysis of the product was as follows:

Calculated for $C_7H_9N_7O_{14}$: Percent C, 20.25; percent H, 2.19; percent N, 23.62. Found: Percent C, 20.37; percent H, 2.09; percent N, 23.70.

In the same manner as described in the above examples, other members of the disclosed class of esters can be prepared. For example, n-propyl 4,7,7-trinitro-4-aza-octanoate is prepared by reacting 4,7,7-trinitro-4-aza-octanoyl chloride with n-propanol; 2-nitroethyl 3,5,5-trinitro-3-aza-pentanoate is prepared by reacting 3,5,5-trinitro-3-aza-pentanoyl chloride with 2-nitroethanol; 2,2,4,4-tetranitrobutyl 4,6,6-trinitro-4-aza-heptanoate is prepared by reacting 4,6,6-trinitro-4-aza-heptanoyl chloride with 2,2,4,4-tetranitrobutanol; 2,2-dinitropentyl 3,7,7-trinitro-3-aza-decanoate is prepared by reacting 3,7,7-trinitro-3-aza-decanoyl chloride with 2,2-dinitropentanol-1; and 2,2-dinitropropyl 3,5,5-trinitro-3-aza-hexanoate is prepared by reacting 3,5,5-trinitro-3-aza-hexanoyl chloride with 2,2-dinitropropanol.

Any member of the disclosed class of nitraza esters can be prepared by reacting an appropriate alcohol with a nitraza acid or acid halide in accordance with the teachings of this invention.

This application is a continuation-in-part of our copending application Serial No. 416,382, filed March 15, 1954, now abandoned.

We claim:

1. As new compositions of matter, nitraza esters having the general formula:

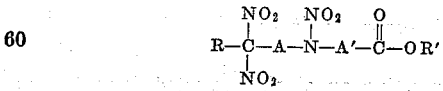

wherein R is a radical selected from the group consisting of hydrogen and lower alkyl radicals, R' is a radical selected from the group consisting of lower alkyl and lower nitroalkyl radicals and A and A' are lower alkylene radicals.

2. As new compositions of matter, nitraza esters having the general formula:

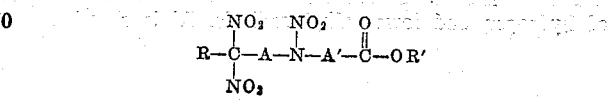

wherein R is a lower alkyl radical, R' is a lower nitroalkyl radical and A and A' are lower alkylene radicals.

3. As new compositions of matter, nitraza esters having the general formula:

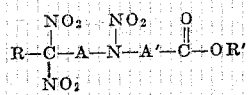

wherein R and R' are lower alkyl radicals and A and A' are lower alkylene radicals.

4. As a new composition of matter, 2,2,2-trinitroethyl-3,5,5-trinitro-3-aza-hexanoate having the structural formula:

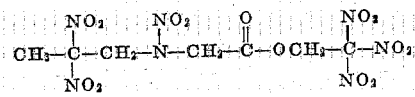

5. As a new composition of matter, methyl 3,5,5-trinitro-3-aza-hexanoate having the structural formula:

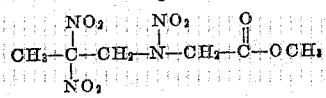

6. As a new composition of matter, n-propyl 4,7,7-trinitro-4-aza-octanoate having the structural formula:

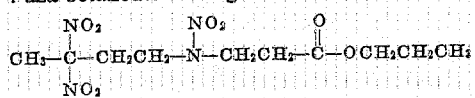

7. As a new composition of matter, 2-nitroethyl 3,5,5-trinitro-3-aza-pentanoate having the structural formula:

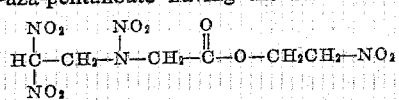

8. As a new composition of matter, 2,2,4,4-tetranitrobutyl 4,6,6-trinitro-4-aza-heptanoate having the structural formula:

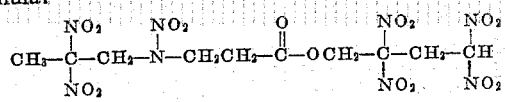

9. As a new composition of matter, 2,2-dinitropentyl 3,7,7-trinitro-3-aza-decanoate having the structural formula:

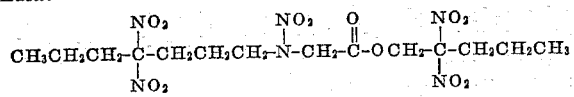

10. As a new composition of matter, 2,2-dinitropropyl 3,5,5-trinitro-3-aza-hexanoate having the structural formula:

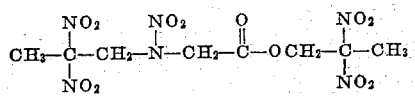

11. The method of preparing nitraza esters having the general formula:

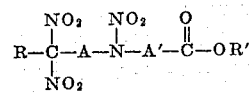

which comprises reacting an alcohol selected from the group consisting of alkanols and nitroalkanols with a compound having the general formula:

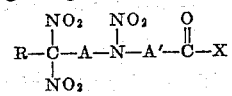

wherein R is a radical selected from the group consisting of hydrogen and lower alkyl radicals, R' is a radical selected from the group consisting of lower alkyl and lower nitroalkyl radicals, X is a radical selected from the group consisting of halogen and hydroxy radicals and A and A' are lower alkylene radicals.

12. The method of claim 11 wherein the reaction is conducted in the presence of a Friedel-Crafts catalyst.

13. The method of claim 11 wherein the reaction is conducted in the presence of aluminum chloride.

14. The method of preparing nitraza esters having the general formula:

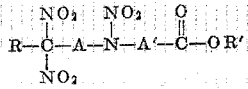

which comprises reacting an alkanol with an acid halide having the general formula:

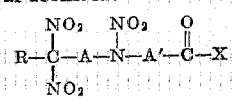

wherein R and R' are lower alkyl radicals, A and A' are lower alkylene radicals and X is a halogen radical.

15. The method of preparing nitraza esters having the general formula:

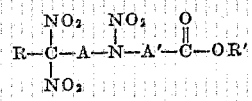

which comprises reacting a nitroalkanol with an acid halide having the general formula:

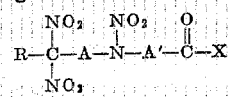

wherein R is a lower alkyl radical, R' is a lower nitroalkyl radical, X is a halogen radical and A and A' are lower alkylene radicals.

16. The method of preparing 2,2,2-trinitroethyl 3,5,5-trinitro-3-aza-hexanoate which comprises reacting 3,5,5-trinitro-3-aza-hexanoyl chloride with 2,2,2-trinitroethanol.

17. The method of preparing methyl 3,5,5-trinitro-3-aza-hexanoate which comprises reacting 3,5,5-trinitro-3-aza-hexanoyl chloride with methanol.

18. The method of preparing n-propyl 4,7,7-trinitro-4-aza-octanoate which comprises reacting 4,7,7-trinitro-4-aza-octanoyl chloride with n-propanol.

19. The method of preparing 2-nitroethyl 3,5,5-trinitro-3-aza-pentanoate which comprises reacting 3,5,5-trinitro-3-aza-pentanoyl chloride with 2-nitroethanol.

20. The method of preparing 2,2,4,4-tetranitrobutyl 4,6,6-trinitro-4-aza-heptanoate which comprises reacting 4,6,6-trinitro-4-aza-heptanoyl chloride with 2,2,4,4-tetranitrobutanol.

21. The method of preparing 2,2-dinitropentyl 3,7,7-trinitro-3-aza-decanoate which comprises reacting 3,7,7-trinitro-3-aza-decanoyl chloride with 2,2-dinitropentanol-1.

22. The method of preparing 2,2-dinitropropyl 3,5,5-trinitro-3-aza-hexanoate which comprises reacting 3,5,5-trinitro-3-aza-hexanoyl chloride with 2,2-dinitropropanol.

References Cited in the file of this patent

UNITED STATES PATENTS 2,485,855    Bloomquist et al.  ------- Oct. 25, 1949

FOREIGN PATENTS 138,456    Sweden  --------------- Dec. 23, 1952

OTHER REFERENCES

Holstead et al.: J. Chem. Soc. (London), 1952, pp. 1886–94.